United States Patent
Delange et al.

(10) Patent No.: US 10,649,759 B1
(45) Date of Patent: May 12, 2020

(54) AUTOMATED TRANSPARENT DISTRIBUTION OF UPDATES TO SERVER COMPUTER SYSTEMS IN A FLEET

(71) Applicant: Amazon Technologies, Inc., Seattle, WA (US)

(72) Inventors: Julien Delange, Alameda, CA (US); Daniel Edenhofer, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 31 days.

(21) Appl. No.: 15/801,068

(22) Filed: Nov. 1, 2017

(51) Int. Cl.
| | |
|---|---|
| *G06F 8/65* | (2018.01) |
| *H04L 29/08* | (2006.01) |
| *G06F 8/60* | (2018.01) |
| *G06F 8/70* | (2018.01) |
| *G06F 11/07* | (2006.01) |

(52) U.S. Cl.
CPC .............. *G06F 8/65* (2013.01); *G06F 8/60* (2013.01); *G06F 8/70* (2013.01); *G06F 11/07* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 7,020,706 | B2 * | 3/2006 | Cates | H04L 67/1002 709/229 |
| 8,701,103 | B1 * | 4/2014 | Hsu | G06F 8/65 717/171 |
| 2015/0178063 | A1 * | 6/2015 | Narkinsky | G06F 8/658 717/168 |
| 2016/0019043 | A1 * | 1/2016 | Ramasamy | G06F 8/656 717/171 |
| 2016/0103673 | A1 * | 4/2016 | Curran | G06F 8/65 717/168 |

* cited by examiner

*Primary Examiner* — Duy Khuong T Nguyen
*Assistant Examiner* — Mark A Gooray
(74) *Attorney, Agent, or Firm* — Davis Wright Tremaine LLP

(57) ABSTRACT

A deployment subsystem provides updates to an application and/or software executed by server computer systems. The update is included in an update script. Execution of the update script by a server computer system causes the server computer system to execute a set of checks. After completing the set of checks the server computer system may execute the update to the application and/or software executed by server computer systems.

20 Claims, 8 Drawing Sheets

AUTOMATED TRANSPARENT DISTRIBUTION OF UPDATES TO SERVER COMPUTER SYSTEMS IN A FLEET

BACKGROUND

Customers of a computing resource service provider may reduce expenses and overhead by using remote program execution and remote data storage services provided by the computing resource service provider. Customer applications may be distributed over multiple virtual machine instances and computing systems. In addition, these computing systems may include various block-level storage devices. In distributed computing environments, however, scalability, availability, durability, and performance are complex problems to solve, especially as the number of devices involved increases. Moreover, many distributed computer systems involve computing resources that may occasionally require updates to software executed by the computing resources. In addition, new software may, from time to time, be deployed to computing resources. Adding to the complexity are differences in devices, such as different disk drives and, generally, differences that introduce additional factors to be taken into account when managing systems. As a result, maintaining scalability, availability, durability, and performance in distributed computing environments with heterogeneous computing resources that may occasionally receive new software and/or updates to software executed by the computing resources is difficult and complex. In addition, this difficulty and complexity increases with the size of these distributed computing resource environments.

BRIEF DESCRIPTION OF THE DRAWINGS

Various techniques will be described with reference to the drawings, in which.

DETAILED DESCRIPTION

Figure 1:
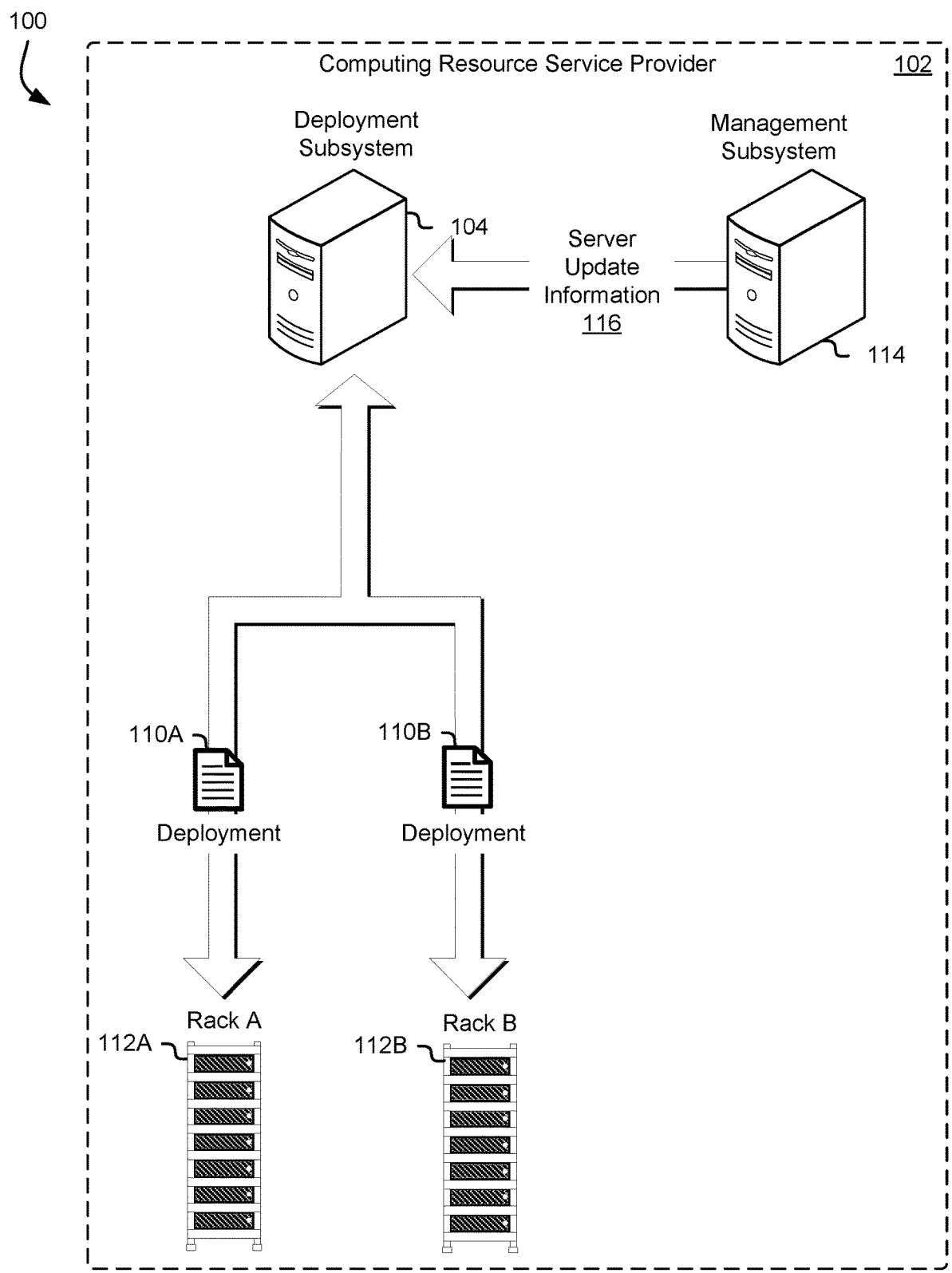
FIG. 1 illustrates an environment in which a deployment subsystem provides a software update to computing resources of a service in accordance with an embodiment.

Techniques and systems described below relate to deployment of software updates to server computer systems in distributed computing resource environments. In one example, a management subsystem and a deployment subsystem coordinate the deployment of software updates to server computer systems in a fleet. The fleet of server computer systems may be operated by a computing resource service provider and provide customers of the computing resource service provider with access to computing resources of the server computer systems through one or more services offered by the computing resource server provider. In one example, the server computer systems implement a data storage service that provides data storage volumes to customers of the computing resource service provider. The data storage volumes may, for instance, be used to store data for server computer systems also provided by the computing resource service provider. In another example, the server computer systems implement a computer service that provides computational resources to customers of the computing resource server provider. The computational resources may, for instance, be used to execute applications on behalf of customers of the computing resource service provider.

As described in greater detail below, the deployment subsystem may obtain an update script from the management subsystem. The update script, in an example, includes computer-executable code that, when executed by a server computer system, causes the server computer system to execute a set of operations that cause software executed by the server computer system to be updated, installed, or otherwise modified. As new features and services are developed, new versions of the applications and/or new applications are available for execution by the server computer systems. Due to availability requirements, in many instances, it may be difficult to upgrade and/or update the software executed some or all of the server computer systems in the fleet. As a result, many of the server computer systems in the fleet may be executing different version of various applications and/or software, which may make it difficult for the computing resource service provider to roll out new services and/or features without affecting entities that utilize the server computer systems.

In one example, the deployment subsystem determines a portion of the fleet (e.g., the minimum of 1% of the total server computer systems in the fleet or 100 server computer systems) to provide the update script to cause the server computer systems to execute the script. If an operation of the update script fails for a particular server computer system, the particular server computer system may then return information to the deployment subsystem indicating that the update script has failed. The deployment subsystem, in an example, then places the particular server computer system in a wait list. The wait list may include a list of server computer systems that have failed an operation of the update script and are waiting to rerun the update script. As described in greater detail below, the operations of the update script may include various operations that may reduce customer impact and increase availability of the server computer systems during deployments.

In one example, the server computer systems may maintain redundant copies of customer data, if a particular server computer system being updated contains customer data that does not include a redundant copy, executing of the update script causes the particular server computer system to initiate a workflow to generate a redundant copy of the customer data and transmit a notification to the deployment subsystem that the particular server computer system failed the update. In this manner, the deployment subsystem may provide the update script to other sever computer systems and advance the update operations within the fleet while operations are performed to place the particular server computer system in a condition where the update script can be executed without impact on customers of the computing resource service provider.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which a deployment subsystem 104 obtains an update to an application or other software executed by server computer systems from a management subsystem 114 and executes a deployment of the update 116 to the server computer systems in accordance with an embodiment. In various embodiments, a computing resource service provider 102 operates one or more data centers including physical computing resources as described in greater detail below in connection with FIG. 3. These computing resources may be provided to customers, services (e.g., the data storage service, compute service, etc.), and other entities. In one example, server computer systems includes in a set of racks 112A-112B (e.g., rack A and rack B) execute applications, software, and other executable code that, when executed by the server computer systems, cause the server computer systems to implement one or more services as described in the present disclosure. The management subsystem 114 includes, in various embodiments, an application or other executable code that, when executed by the sever computer systems, causes server computer systems to perform various management operations as described in greater detail below.

Furthermore, as described above, updates to existing software and/or new software may be required to implement new features of a service, new services, new components (e.g., hardware and software) of the server computer systems, new physical hardware operated by the computing resource service provider 102, or other component of the computing environment operated by the computing resource service provider. In one example, a new feature of a data storage service provided by the computing resource service provider 102 requires an update to software executed by the server computer systems in the set of racks 112A-112B that implements the data storage service. In another example, a new hardware component of the set of racks 112A-112B requires an update to the software of the server computer systems in the set of racks 112A-112B to enable the server computer systems to communicate with the new hardware component. As illustrated in FIG. 1, the deployment subsystem 104 may transmit deployments 110A-110B to server computer systems within the set of racks 112A-112B.

In various embodiments, the deployments 110A-110B include any software deployment, executable script, software package, or other distribution of executable code configured to install and/or update software of a server computer system or other computer systems capable of executing the source code associated with the software. These software deployments 110A-110B (e.g., an update script) may include all of the activities and/or operations that make an application and/or software available for use by the computer system. The general deployment process may consist of several interrelated activities with possible transitions between them as described in greater detail below. These activities can occur at the software developer side (e.g., deployment subsystem 104), client side (e.g., the server computer systems executing the source code), or both.

Various different deployments 110A-110B and deployment activities may be utilized in accordance with the present disclosure. The deployment subsystem 104 may manage various deployment activities such as preparing a particular deployment for release to the server computer systems, installing and activating the executable content included in the deployment, version tracking, updating, uninstalling, and various other activities suitable for deploying software to server computer systems. In one example, the deployment subsystems 104 manages the release of deployments 110A-110B to the server computer systems such that the deployments 110A-110B are provided to the minimum of 1% for the fleet of server computer systems or one hundred server computer systems. In this manner the deployment subsystem 104 can control the rate at which updates are executed by the server computer systems and mitigate and/or eliminate impact on customers of the computing resource service provider 102.

Furthermore, the deployment subsystem 104, as illustrated in FIG. 1, is a component of the computing resource service provider 102 implemented by server computer systems in a data center operated by the computing resource service provider 102. In an embodiment, the computing resource service provider 102 provides customers of the computing resource service provider with logical storage volumes which may be used to store blocks of data on behalf of the customer through a data storage service (not illustrated in FIG. 1 for simplicity) implemented at least in part by software executed by the server computer systems. In yet other embodiments, the computing resource service provider 102 provides customers computing resources to perform computational tasks, storage operations, execute applications, or generally leverage the computing resources to perform various tasks. As described in greater detail below, the computing resources provided by the computing resource service provider 102 may include processing units, storage devices, network appliances, or other devices to support the executing of customer applications and/or tasks. Furthermore, the computing resources may include virtualized computing resources such as virtual machines, virtual storage devices, or any other computing resources capable of being virtualized.

Returning to FIG. 1, the set of racks 112A-112B (e.g., rack A and rack B) contain physical computing resources which are used to provide computing resources as described in the present disclosure. The set of racks 112A-112B may include any computing resources used to execute an application, storage data, implement a network, or other task on behalf of the customer or service. Furthermore, the set of racks 112A-112B may include computing resources provided by the computing resource service provider 102 and/or customer of the computing resource service provider 102. In one example, a portion of the set of racks 112A-112B is provided by the customer in an on-premises data center (e.g., a data center operated by the customer) and another portion of the set of racks 112A-112B is provided by the computing resource service provider (e.g., the data storage service). For the purposes of the present disclosure the set of racks 112A-112B may include computing resources entirely provided by the computing resource service provider 102 or the customer. In embodiments, where the set of racks 112A-112B are provided by the customer, the customer provides the deployment subsystem 104 with access to the computing resource within the set of racks 112A-112B. In one example, the customer executes an agent or other component of the deployment subsystem 104 responsible for transmitting server information 106 to the deployment subsystem 104.

In various embodiments, the computing resource service provider 102 includes a front-end server (not shown in FIG. 1 for simplicity), which enable communication between various entities such as the customers and the computing resources made available to the customers through the various services. As illustrated in FIG. 1, the deployments 110A-110B are provided to the set of racks 112A-112B and/or components thereof such as the server computer systems within the set of racks 112A-112B. As described in greater detail below in connection with FIG. 3, the deployment subsystems and the server computer systems within the set of racks 112A-112B may be connected through one or more networks implemented by network appliances such as routers and switches. Furthermore, the deployments 110A-110B may include update scripts that, when executed by the server computer systems, cause the server computer systems to execute various operations.

In one example, as described in greater detail below in connection with FIG. 6, the update script causes the server computer system to determine if any customer data is not associated with a redundant copy of the customer data and generate the redundant copy of the customer data, determine if a snapshot of volume is being executed and move the volume to another server computer system, and delete any unused or previous copies of customer data prior to restarting and updating the software of the server computer system. As described above, these operations may be performed to reduce impact on customers of the computing resource service provider 102 as a result of the server computer systems being updated. In various embodiments, the server computer systems within the set of racks 112A-112B provide customers of the computing resource service provider 102 with access to logical storage volumes. These logical storage volumes may operate as block-level storage devices for virtual machines operated by the customer. Furthermore, in an embodiment, the logical storage volumes includes a plurality of partitions (e.g., copies of the logical storage volumes) to provide data redundancy and availability. In such embodiments, sever computer systems, during execution of the update script, may determine if the logical storage volumes supported by the server computer systems are associated with a slave partition (e.g., there is another server computer system maintaining a copy of the logical storage volume).

In various embodiments, if a particular server computer system determines that there is at least one logical storage volume that is not associated with a slave partition or a plurality of other partitions (e.g., a single storage partition without an associated redundant copy of the storage partition), the particular server computer system transmits an exception to the deployment subsystem 104 and causes a slave partition to be created. The information transmitted to the deployment subsystem 104 may cause the deployment subsystem 104 to indicate that the software executed by the particular server computer system has not been updated. In one example, the deployment subsystem 104 places information identifying the particular server computer system in a wait list. In addition, the particular server computer system may cause a slave partition to be created. In various embodiments, the server computer systems transmit a service call (e.g., application programming interface call) to a service of the computing resource service provider 102 such as a data storage service. Fulfillment of the service call may cause the service to determine a server computer system with sufficient capacity to support the slave partition and cause a copy of the logical storage volume to be created.

In yet other embodiments, the server computer systems determine if one or more logical storage volumes supported by the server computer systems is currently being snapshotted. During snapshot operations a copy of the current state of a virtual machine including any logical storage volumes associated with the virtual machine may be generated. Therefore, in various embodiments, to avoid impacting the operation of the snapshot the server computer system causes the logical storage volume being snapshotted to be moved to a different server computer system. Similarly, as described above, if a particular server computer system contains at least one logical storage volume that is being snapshotted the particular server computer system transmits an exception to the deployment subsystems 104 and causes the logical storage volume to be moved to a different server computer system. In addition, in some embodiments, the server computer systems may determine if there are logical storage volumes that are no longer in use or may be previous versions and/or copies of logical storage volumes and delete the logical storage volumes prior to restarting and updating the software executed by the server computer system.

During execution of the update script of various check and/or operations completed successfully (e.g., all logical storage volumes are associated with redundant copies, not logical storage volume is currently being snapshotted, etc.) the server computer system may restart and update the software and/or install new software. Furthermore, once the server computer systems restarts and successfully installs the software update, in various embodiments, the server computer systems may perform additional checks. In one example, the server computer systems determine the copy of the logical partitions (e.g., which partition may be labeled a "master partition" or a "slave partition") contains the most data written to disk. In some embodiments, there may be data written to disk but still awaiting copying from one partition to the other partition of the pair of partitions providing redundant copies of the customer data. In such scenarios, the server computer systems may determine which copy of the logical storage volume has the most amount of data written to disk and cause that copy to be the master partition. In scenarios where there is not data waiting to be written to disk or the partitions contain the same amount of data written to disk the server computer systems may not cause the designation of a master partition to be modified.

In various embodiments, the server computer systems maintain the information to perform the various checks as described above. In yet other embodiments, execution of the update script causes the server computer systems to obtain the data from other computing resources such as a service of the computing resource service provider 102. In addition, the deployment subsystem 104 may provide the deployments 110A-110B to the server computer systems over an interval of time or until all of the server computer systems have executed the update script.

Figure 2:
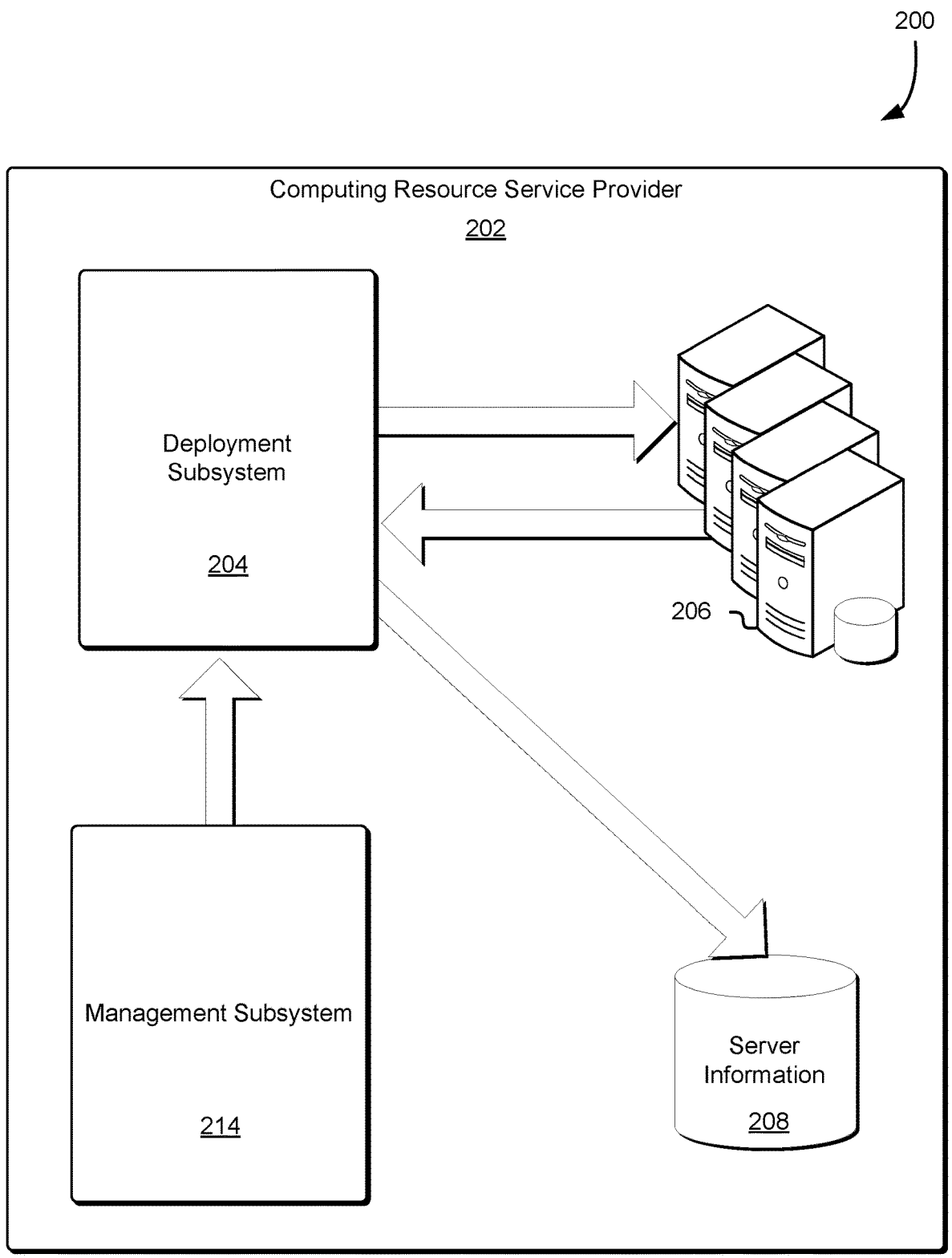
FIG. 2 illustrates an example of a service provided by a computing resource service provider in accordance with an embodiment.

FIG. 2 shows an illustrative example of an environment 200 which includes a service that is provided by a computing resource service provider 202 in accordance with an embodiment. The service of a computing resource service provider 202 may be used to operate a block-level data storage service, a compute service, a networking service, an on-demand data storage service, or other service of a computing resource service provider 202 that utilizes computing resources to implement, service and provide functionality to a customer such as described above in connection with FIGS. 1 and 2. As illustrated in FIG. 2, the service includes various subsystems such as a deployment subsystem 204 and a management subsystem 214. The service may also include a plurality of server computer systems 206 and a server information data store 208, which may store information and/or metadata associated with the server computer systems 206 such as software version, wait lists, failed lists, or any other information or metadata associated with the process of deploying updates to the server computer systems 206.

In an embodiment, the service of the computing resource service provider 202 includes a request processing subsystem which is a collection of computing resources, such as webservers and application servers, collectively configured to process requests submitted to the computing resource service provider 202. The request processing subsystem, for example, may include one or more webservers that provide a web service interface to enable customers of the service of the computing resource service provider 202 to submit requests to be processed by the service of the computing resource service provider 202. In various embodiments, the deployment subsystem 204 includes executable code or other logic that, when executed by a computer system such as the server computer systems 206, causes the computer systems to perform various operations such as providing deployments to the server computer systems 206 as described above.

Components of the deployment subsystem 204 may interact with other components of the service or the computing resource service provider 202 (e.g., through network communications). For example, in deploying an update script to a particular server computer system 206 the deployment subsystem 204 may transmit data over a network implemented by various network appliances of the computing resource service provider 202 to the particular server computer system 206. In another example, the deployment subsystem 204 may obtain a software update from the management subsystem 214 and, as a result, generate an update script to be executed by the server computer systems 206. Communication between the various subsystems (e.g., the deployment subsystem 204 and the management subsystem 214), in various embodiments, is accomplished by the transmission of requests between the computing resources implementing the various subsystems. Furthermore, in some embodiments, the request processing subsystem may be responsible for receiving requests and directing the requests to the appropriate subsystem.

In one example, these requests may be processed by the management subsystem 214 upon receipt by the request processing subsystem. If applicable, various requests processed by the request processing subsystem and/or management subsystem 214 may result in the management subsystem 214 updating metadata associated with the server computer systems 206 and maintained in the server information data store 208. In one example, if a particular server computer system 206 provides the deployment subsystem 204 with an exception (e.g., at least one check and/or operation of the update script failed), the deployment subsystem 204 may transmit a request to the management subsystem 214 to update the information stored in the server information data store 208 to add the particular server computer system 206 to a wait list. Additionally, the management subsystem 214 and deployment subsystem 204 may utilize information included in the server information data store 208 to perform various operations described in the present disclosure.

In addition, some requests processed by the request processing subsystem that involve operations on data objects (e.g., upload, download, delete) may include interactions between the request processing subsystem and one or more server computer systems 206. In various embodiments, the server computer systems 206 are computer systems communicatively coupled with one or more storage devices for the persistence of data objects. In one example, in order to process a request to upload a data object, the request processing subsystem may transmit data to server computer systems 206 for persistent storage. It is noted, however, that in some embodiments, client (e.g., customer) computer systems may transmit data directly to the server computer systems 206 instead of through servers of the request processing subsystem.

In some embodiments, data is maintained by multiple server computer systems 206 for the purposes of redundantly storing the data to allow the retrievability of data in the event of failure of an individual server computer system 206 and/or associated data storage device. For example, in some embodiments, logical storage volumes may include a plurality of storage partitions to provide data redundancy. In such embodiments, execution of an update script by a particular server computer system 206 includes updating the metadata associated with each logical storage volume supported by the particular server computer system 206 such that the metadata associated with storage partitions supported by the particular server computer system 206 is changed to indicate that the particular server computer system 206 is being updated. In an example, this update to the metadata enables the computing resource service provider 202 to fulfill requests using redundant copies of the data contained in the logical storage volume (e.g., transmit the request to other server computer systems maintaining a copy of the storage partition). In embodiments, where there is only a single partition (e.g., a single data partition or no data redundancy is utilized) updating the server computer systems 206 includes copying data from the server computer systems 206 to another server computer system 206 as described above.

As described in greater detail below, information maintained in the server information data store 208 may be used to manage the deployment of software updates to the server computer systems 206. In one example, the information is used to track successful execution of the updates on server computer systems 206 as well as track which server computer systems failed at least one check of the update script and still need to successfully execute the update script to update the software executed by the server computer systems. In one example, the server information includes a wait list which indicates server computer systems 206 awaiting successful execution of the update script. In various embodiments, the deployment subsystem 204 may select server computer systems 206 (e.g., server computer systems indicated in the wait list) based at least in part on a variety of factors including oldest software version, particular software version, most out-of-date software version, hardware component of the server computer systems, software of the server computer systems, randomly, pseudorandomly, or based at least in part on any other suitable selection mechanism.

Figure 3:
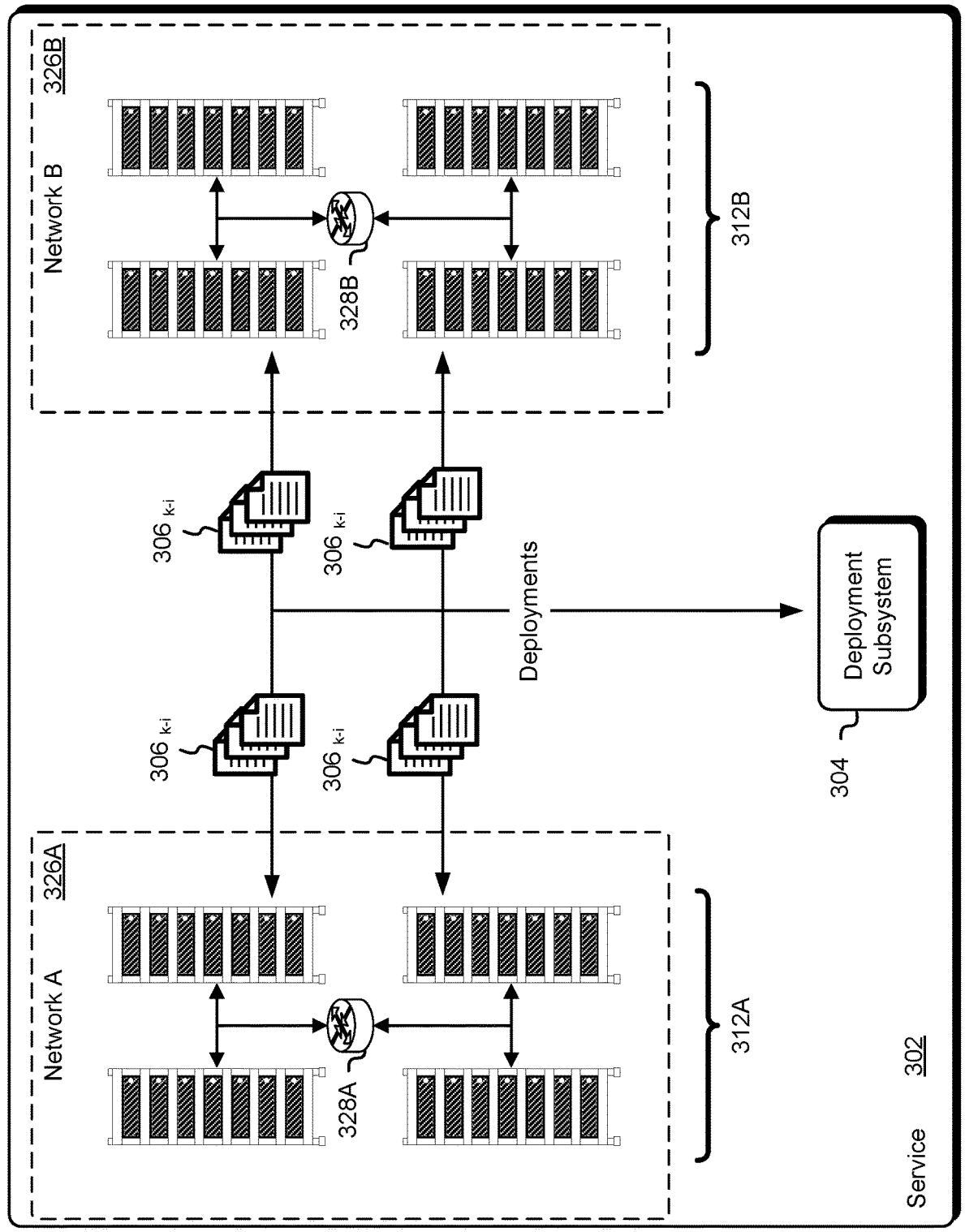
FIG. 3 illustrates an environment in which a deployment subsystem provides a software update to computing resources of a service in accordance with an embodiment.

FIG. 3 illustrates an aspect of an environment 300 in which an embodiment may be practiced. Specifically, FIG. 3 depicts the distribution of deployments 306 by a deployment subsystem 304 thereby causing computing resources within the servers in sets of racks 312A-312B to execute the deployments 306 and update and/or install application, software, and other executable code on the computing resources within the servers in sets of racks 312A-312B. The environment 300 includes the deployment subsystem 304 of a service 302, as described above, that provides deployments 306 to server computer systems or other components of the sets of racks 312A-312B. The deployments $306_{k-i}$ provided to different server computer systems in the sets of racks 312A-312B may include update scripts as described above. In one example, the update script includes a set of operations and/or checks to ensure that restart and update operations executed by the server computer systems do not impact customers of the service 302 and/or a computing resource service provider.

As described above, these checks may include ensuring that data maintained by the server computer systems is associated with a redundant copy maintained by another server computer system, that data maintained by the server computer systems is not currently being snapshotted or used for other operations that require the data to be available, that the server computer systems is not maintaining unused data that may delay or otherwise increase an amount of time needed to restart the server computer systems, or any other check suitable for reducing customer impact. In one example, the server computer systems contains a storage partition that is not associated with a redundant copy of the storage partition and, as a result, transmits an exception to the deployment subsystems 304 and causes the storage partition to be remirrored or otherwise causes a copy of the partition to be stored by another server computer system. In various embodiments, a storage partition includes any data maintained by a server computer system that is not associated with a redundant copy of the data. In one example, a storage partition includes a partition of a logical storage volume that was at one point associated with a redundant copy of the logical storage volume (e.g., a master or slave partition) but no longer is associated with the redundant copy. The redundant copy, in various embodiments, may have been deleted, the server supporting the redundant copy may have filed, a network failure may have rendered the server supporting the redundant copy in accessible, or any number of other reasons. In yet other embodiments, the logical storage volume is associated with a plurality of storage partitions to provide data redundancy.

The deployment subsystem 304 may be software or executable code executed by the servers in the sets of racks 312A-312B or other computing resources to provide deployments $306_{k-i}$ to the server computer systems in the sets of racks 312A-312B and track update operations of the server computer systems in the sets of racks 312A-312B as described above in conjunction with FIG. 1. The sets of racks 312A-312B may be physical hardware that hosts one or more server computer systems or, in some embodiments, is simply a logical grouping of the one or more server computer systems. Examples of logical groupings, other than by rack, may include servers grouped together based on data center location, servers in different fault isolation groups (i.e., logical divisions of resources such that failure of one fault zone may not affect servers in the other zones; e.g., grouped by geographic regions, data centers, hard drive clusters, backup generators, etc.), servers grouped together based on performance characteristics (e.g., throughput, input/output operations per second, etc.), and so on. The server computer systems in a rack may be members of a particular network. In some implementations, multiple racks of servers may be members of the same network. For example, as illustrated in FIG. 3, the server computer systems of the set of racks 312A share the network 326A. Likewise, the servers of the set of racks 312B share the network 326B.

The networks 326A-326B may be data communication pathways between one or more electronic devices. The networks 326A-326B may be wired or wireless networks and may use any of a variety of communications protocols for organizing their network traffic. The networks 326A-326B may allow the sharing of files, data, and other types of information between the one or more electronic devices accessible through the data communication pathways. Each of the networks 326A-326B may be associated with a router, such as an aggregation router that aggregates the servers of the respective set of racks into the common network, separate from the router associated with the other network. Each of the networks 326A-326B may be on a different subnet than the other network. For example, as illustrated in FIG. 3, the servers of the set of racks 312A may be commonly connected to a router 328A. Similarly, the servers of the set of racks 312B may be commonly connected to a router 328B. The routers 328A-328B may be networking devices that forward packets between computer networks, such as between the networks 326A-326B.

As described above, the deployment subsystem 304 may provide deployments $306_{k-i}$ and store the deployments $306_{k-i}$ for use in updating software executed by the server computer systems in the sets of racks 312A-312B. The deployment subsystem 304 may obtain the deployments $306_{k-i}$ from a management subsystem as described above. Furthermore, the deployment subsystem 304 may also include a data warehouse or data storage system that stores the deployments $306_{k-i}$ such that the deployments $306_{k-i}$ may be queried.

The service 302 or component thereof such as the management subsystems, as described above, may cause one or more server computer systems to transfer the data. In one example, the management subsystem causes data maintained by a server computer system that is not associated with a redundant copy to be copied to another server computer system to generate a redundant copy. If no free space is available the service 302 may generate an exception indicating that there is insufficient capacity to transfer the data to another server in the set of racks 312A-312B.

Figure 4:
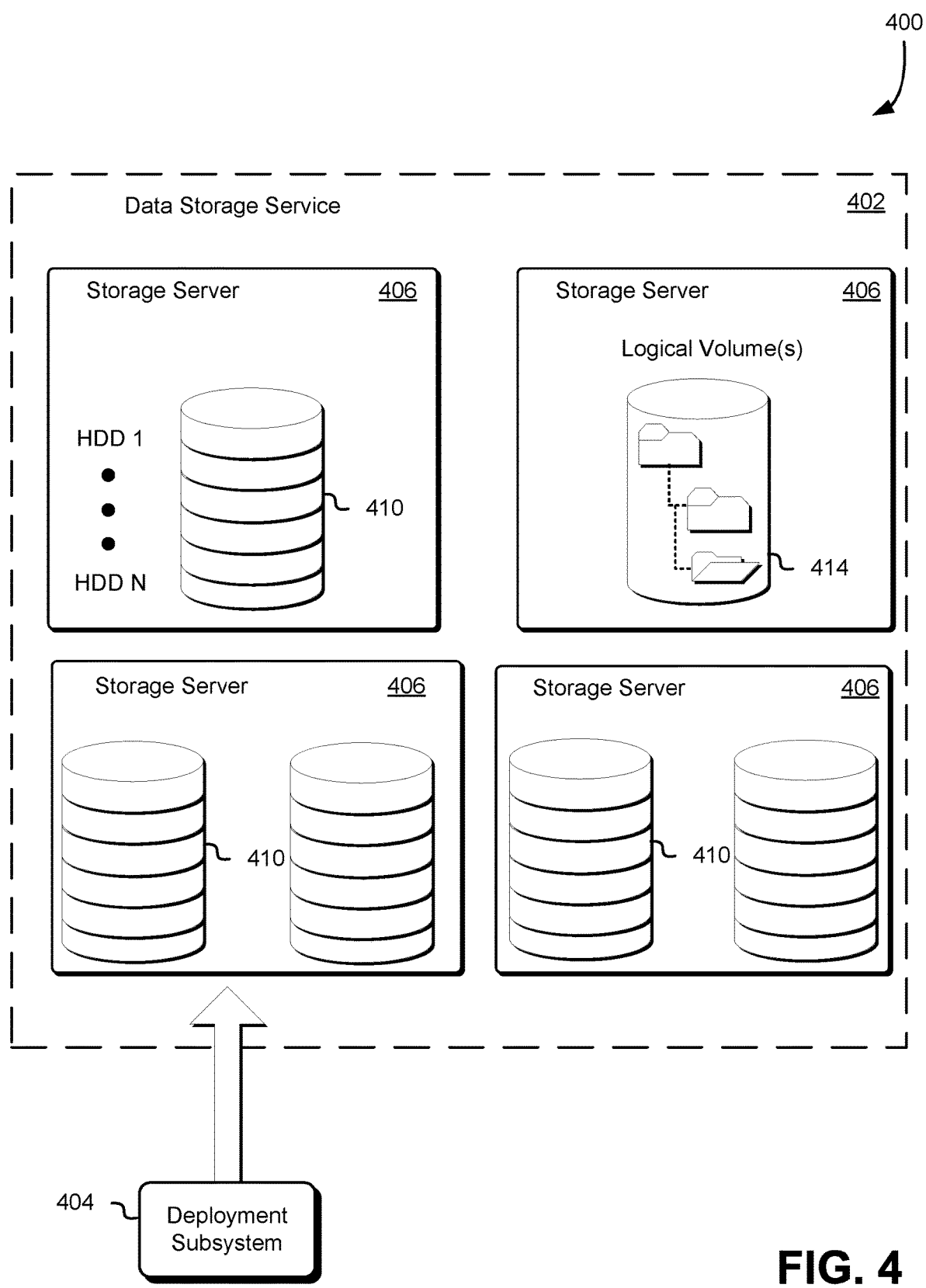
FIG. 4 illustrates an example of storage nodes of a data storage service in accordance with an embodiment.

FIG. 4 illustrates an example environment 400 where one or more computer systems, as well as the executable code running thereon, may provide customers with logical storage volumes 414 wherein the logical storage volume may be maintained by a data storage service 402 using a storage server 406. The data storage service 402, in various embodiments, is one service of a set of services provided to customers by a computing resource service provider. As described in greater detail below, the data storage service 402 provides customers with logical storage volumes 414 using computing resources of one or more storage servers 406 such as a server computer system. The customer may use these logical data storage volumes to store blocks of data. Furthermore, in some examples, the data storage service comprises a plurality of server computer systems including storage devices (e.g., hard disk drives) that provide the logical data storage volumes to the customers. These server computer systems may execute various software applications to provide the logical data storage volumes to the customers.

Customer data may be stored across a variety of different data storage servers 406 containing one or more storage devices such as block-level storage devices, illustrated in FIG. 4 as hard disk drives (HDDs) 1 through N 410. The customer data stored on the different devices may be exposed to a computer system operated by the customer and include a logical storage volume 414. Described in greater detail below, the customer may instantiate one or more virtual machines on computing resources of the data storage service 402, and then one or more virtual machines may attach the exposed logical storage volumes 414 to enable the customer to interact with the data stored in the logical storage volumes 414 maintained by the remote storage service using one or more storage servers 406. The logical storage volume 414 may contain one or more files which are simultaneously accessible to multiple computer systems operated by customers of the data storage service 402. Furthermore, as illustrated in FIG. 4, a deployment subsystem, 404 as described above, may provide an update script and/or deployment to the storage servers 406.

As illustrated by FIG. 4, the storage server 406 may include a pool or other collection of storage devices 1 through N configured to store data on behalf of customers of the data storage service 402 or other entities. The hardware configuration of the storage server 406 may include computing resources 410 such as network interfaces, rack, switches, HDDs, solid-state drives or other storage devices, processors, memory, or any other physical component of the storage server 406. The software configuration of the storage server 406 may include logical storage volume placement algorithms, operating systems, hypervisors, throttling applications, or other applications managing customer access to computing resources of the storage server 406, and any other application loaded into memory of the storage server 406. The storage server 406 may be accessible by an IP address or other network information. Example of a storage node is a network (e.g., Ethernet) attached storage (NAS) device, a storage area network (SAN) storage device, or a NAS-SAN hybrid storage device. NAS protocols include network file system (NFS), server message block/common internet file system (SMB/CIFS), and Apple filing protocol (AFP). SAN protocols include Fibre Channel, iSCSI, AT Attachment over Ethernet (AoE), and HyperSCSI.

As described above, a deployment subsystem 404 or stream service may provide deployments to the storage server 406 or components thereof such as the computing resources 410. In various embodiments, the storage server 406 executes an update script included in the deployment which causes the storage server 406 to execute various checks and/or operations to reduce customer impact when updating software executed by the storage server 406. Although a storage server 406 is illustrated in FIG. 4, various different types of server computer systems may be used in connection with the techniques described in the present disclosure.

Figure 5:
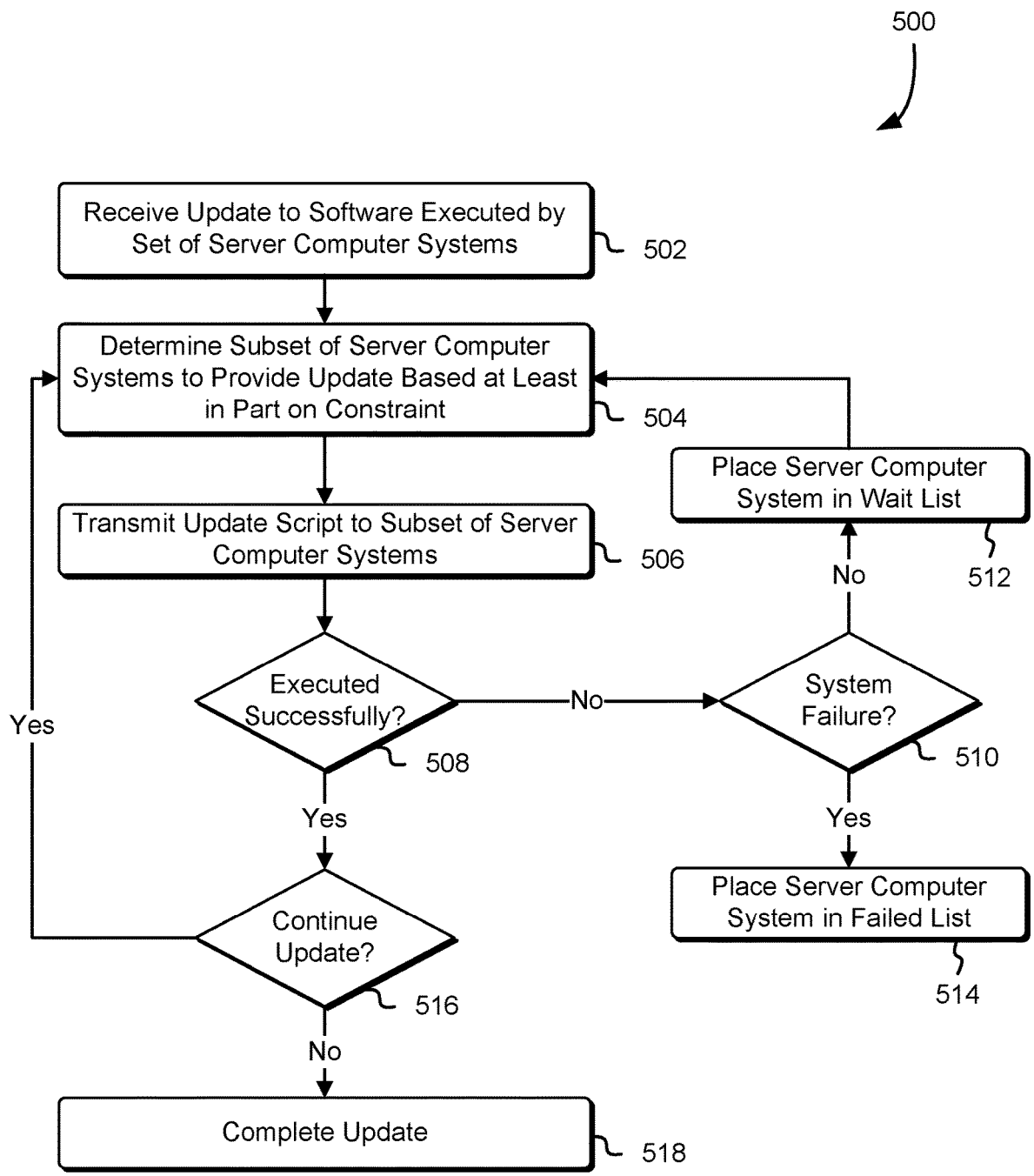
FIG. 5 shows an illustrative process which may be used to provide a software update to computing resources of a service in accordance with an embodiment.

FIG. 5 is a block diagram illustrating an example of a process 500 for executing an update script included in a deployment obtained from a deployment subsystem in accordance with at least one embodiment. Some or all of the process 500 (or any other processes described, or variations and/or combinations of those processes) may be performed under the control of one or more computer systems, including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 500 may be performed by any suitable system, such as a server in a data center, by various components of the environment 100 described in conjunction with FIG. 1, such as the deployment subsystem, by multiple computing devices in a distributed system of a computing resource service provider or by a service provided by a computing resource service provider. The process 500 includes a series of operations which result in the server computer system executing an update of an application, software, or other executable code of the server computer system and determining the update was executed successfully. For example, the process 500 includes receiving an update to software executed by a set of server computer systems 502. As described above, the update may include a new version of software, a new application, or any other modification to executable code run by the set of server computer systems. In various embodiments, the update includes an executable that when included in an update script and executed by a server computer system of the set of server computer systems causes software executed by the server computer systems to be updated. In one example, the update modifies an application executed by the server computer systems that implements a service of the computing resource service provider. In another example, the update modifies an operating system executed by the server computer systems.

In step 504, the deployment subsystem determines a subset of server computer systems of the set of server computer systems to provide the update based at least in part on a constraint. In one example, as described above, the deployment subsystem ensures that the update script is provided to 1% or 100 server computer systems which ever value is the lowest. Furthermore, other constraints may be used in accordance with the present disclosure such that an impact of causing the update to be executed by the server computer systems is reduced. In another example, the deployment subsystem determines the subset of server computer systems based at least in part on an attribute of the server computer systems such as a version of the software executed by the server computer systems or hardware component of the server computer systems.

In step 506, the deployment subsystem transmits the update script to the subset of server computer systems. As described above, the update script may be transmitted over a network including one or more network appliances. The network may include public and private network such as the Internet. In step 508, the deployment subsystem may receive an indication of whether the update script was executed successfully. The indication may be obtained from the server computer systems as a result of executing the update script as described above. If the deployment subsystem determines, based at least in part on the indication, that the update script executed successfully, the deployment subsystem may return to step 504 and determine additional server computer systems to provide the update script. In various embodiments, if no server computer systems remain (e.g., all server computer systems have successfully executed the scripts and/or have failed) the deployment subsystem may terminate the process 500.

In step 510, the deployment subsystem determines if the server computer systems returned an indication indicating system failure 510. As described above, failing a check of the update script may not indicate failure of the server computer systems but simply that additional operations may need to be performed before the update scrip can be executed successfully. However, in various embodiments, a server computer system may fail and may not be able to successfully execute the update script without repair. In various embodiments, the deployment subsystem determines a cause of the system failure and executes a workflow to repair the server computer system and places the sever computer system in the wait list. In one example, the deployment subsystem, in response to a system failure, causes the server computer system to execute operations to clean the hard disk drives of the server computer systems and places the server computer system back in the wait list to re-run the update at a later point in time. In addition, the deployment subsystem may maintain a counter for a number of retries for server computer systems that return a system failure. For example, the deployment subsystem may allow for a maximum of five retries of a failed server computer system before placing the server computer system in the failed list. If the server computer system returns an indication of system failure, the deployment subsystem in step 514, places the server computer system in a failed list. As described above, the failed list may be maintained in a data store and may indicate server computer systems that failed and could not execute the update script successfully.

If the server computer systems returns an indication of system failure, the deployment subsystem in step 512, places the server computer systems in a wait list. As described above, the wait list may be maintained in a data store and may indicate server computer systems that have failed a check of the update script and that are awaiting to re-attempt to execute the update script. In various embodiments, the server computer systems may await an indication from the deployment subsystem to re-attempt to execute the update script. In step 516, the deployment subsystem determines whether to continue updating server computer systems. For example, the deployment subsystem may cause 10 server computer systems to execute the update but the set of server computer systems may include 100 server computer systems. In another example, the deployment server cause updates to be execute for an interval of time (e.g., 2 days) and after the expiration of the interval of time may complete the update. In step 518, the deployment system completes the update. In this manner, the deployment subsystem, in various embodiments, continues to update server computer systems until one or more conditions are met, such as all the server computer systems in the set of server computer systems (e.g., server computer systems in a fleet and/or data center) have been updated, the during of the update interval has expired, or any other condition suitable for distributing updates to server computer systems for execution.

In yet other embodiments, the server computer systems await successful execution of various operations (e.g., copying data to another server computer system) before re-attempting to execute the update script. Note that one or more of the operations performed in 502-518 may be performed in various orders and combinations, including in parallel. In numerous variations to the process 500, one or more of the operations 502-518 may be omitted or performed by other systems or services.

Figure 6:
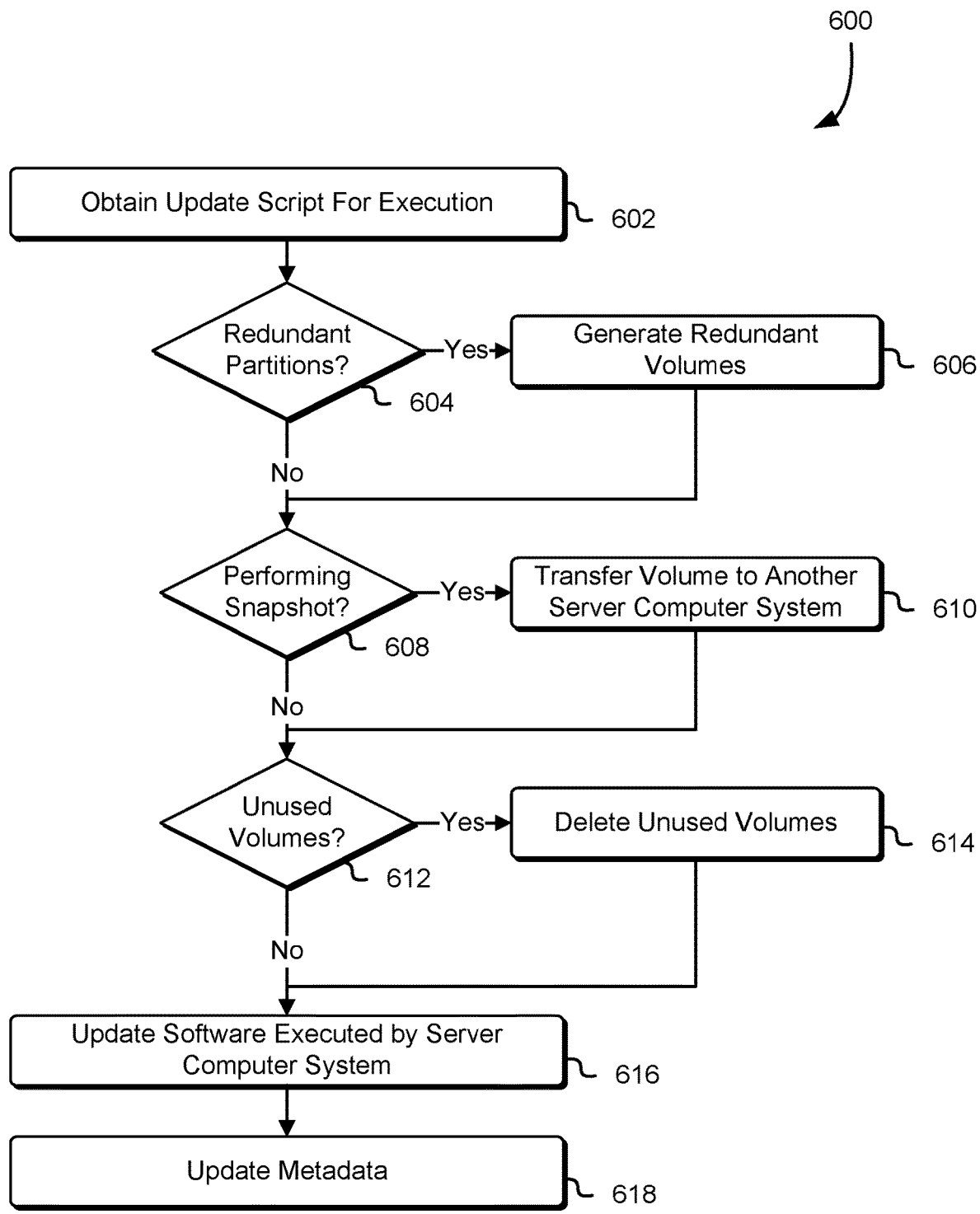
FIG. 6 shows an illustrative process which may be used to execute an update script by server computer systems of a fleet in accordance with an embodiment.

FIG. 6 is a block diagram illustrating an example of a process 600 for performing an update of an application and/or software executed by the server computer systems, such as a data storage server, in accordance with at least one embodiment. Some or all of the process 600 (or any other processes described, or variations and/or combinations of those processes) may be performed under the control of one or more computer systems, including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 600 may be performed by any suitable system, such as a server in a data center, by various components of the environment 100 described in conjunction with FIG. 1, such as the server computer systems, by multiple computing devices in a distributed system of a computing resource service provider or by a service provided by a computing resource service provider. The process 600 includes performing a set of checks and/or operations to reduce customer impact when restarting and updating the server computer systems. In various embodiments, the process 600 ensures that a plurality of server computer systems providing a computing resource are not restarted or otherwise performing an update during the same interval in time. In one example, the process 600 ensures that two server computer systems providing the same logical storage volume are not updated at the same time. Returning to FIG. 6, the process 600 includes obtaining an update script for execution 602. As described above, a deployment subsystem may provide update scripts to server computer systems within racks. The update scripts may be included in a deployment as described above. The deployment may include executable code, software packages, and other data used to update the server computer system.

In step 604, the server computer system determines if the server computer systems maintains one or more storage partitions. In various embodiments, execution of the update script by server computer systems cause the server computer systems to execute various operations described in connection with the process 600. In one example, the update script connects to a command port or other component of the server computer systems to obtain information to process the set of checks described in connection with FIG. 6. Furthermore, as described above, a storage partition may include a volume, block of data, metadata, or other information that is not associated with a redundant copy of the data maintained by another server computer system. In step 604, if the server computer systems maintain one or more storage partitions the process 600 continues to step 606. In step 606, the server computer systems cause the one or more storage partitions to be remirrored. As described above, remirroring a volume may include determining another server computer system with sufficient capacity and causing the other server computer system to maintain a copy of the data. In various embodiments, the server computer systems transmit an API call to a service, such as a data storage service, to remirror the storage partitions. Furthermore, in some embodiments, once the server computer systems no longer maintain any storage partitions the process 600 may continue.

In step 608, the server computer systems determine if a snapshot is being performed on one or more volumes. As described above, performing a snapshot may include copying of data, such as the current state of a logical storage volume and/or virtual machine. If snapshots are being performed, in step 610, the server computer systems cause the volumes associated with the snapshots to be moved to another server computer system. As described above, the server computer systems may transmit an API call to a server or may query other server computer systems to detect a sever computer system with sufficient capacity to support the logical storage volumes. Once the server computer systems determine that there are no logical storage volumes currently being snapshotted, the server computer systems may continue with the process 600.

In step 612, the server computer systems may determine if there are any unused volumes. Unused volumes may include previous copies of the logical storage volumes maintained by the server computer systems. In various embodiments, the unused volumes are associated with logical storage volumes used by the customer and provide the server computer systems with access to metadata and other information from the logical storage volume. In step 614, if the server computer systems is maintaining any unused volumes, the server computer systems delete the unused volumes. Deleting the unused volumes may decrease a restart time of the server computer systems with risking the loss of any customer data as the unused volumes are copies of previous versions and/or states of the logical storage volume.

In step 616, the server computer systems update the software executed by the server computer systems. As described above, the server computer systems may restart and execute the update included in the update script. The update may modify the executable code maintained and/or executed by the server computer systems. In step 618, the server computer systems may update metadata associated with the volume. As described above, once the server computer systems has completed a restart after updating the software, the server computer systems may determine which logical storage volume of the pair of redundant storage volumes (e.g., master partition and slave partition) contains the most data to disk. The server computer systems may then, based at least in part on which logical storage volume partition contains the most data written to disk (e.g., is waiting for the least amount of blocks of customer data to be written to disk), update the metadata to indicate that the logical storage partition with the most data written to disk is the master partition. In some examples, during the time when the server computer systems is restarting, the customer may cause data to be written to disk, as a result, one partition of the logical storage volume may contain more customer data written to disk.

Note that one or more of the operations performed in 602-618 may be performed in various orders and combinations, including in parallel. In numerous variations to the process 600, one or more of the operations 602-618 may be omitted or performed by other systems of services. Furthermore, in yet other variations of the process 600, the server computer systems after each failed check (e.g., the server computer systems contains storage partitions or the server computer systems maintains a logical storage volume being snapshotted), the server computer systems transmits an exception to the deployment subsystem and the process 600 is terminated until the deployment subsystem causes the server computer systems to re-execute the update script as described above in connection with FIG. 5.

Figure 7:
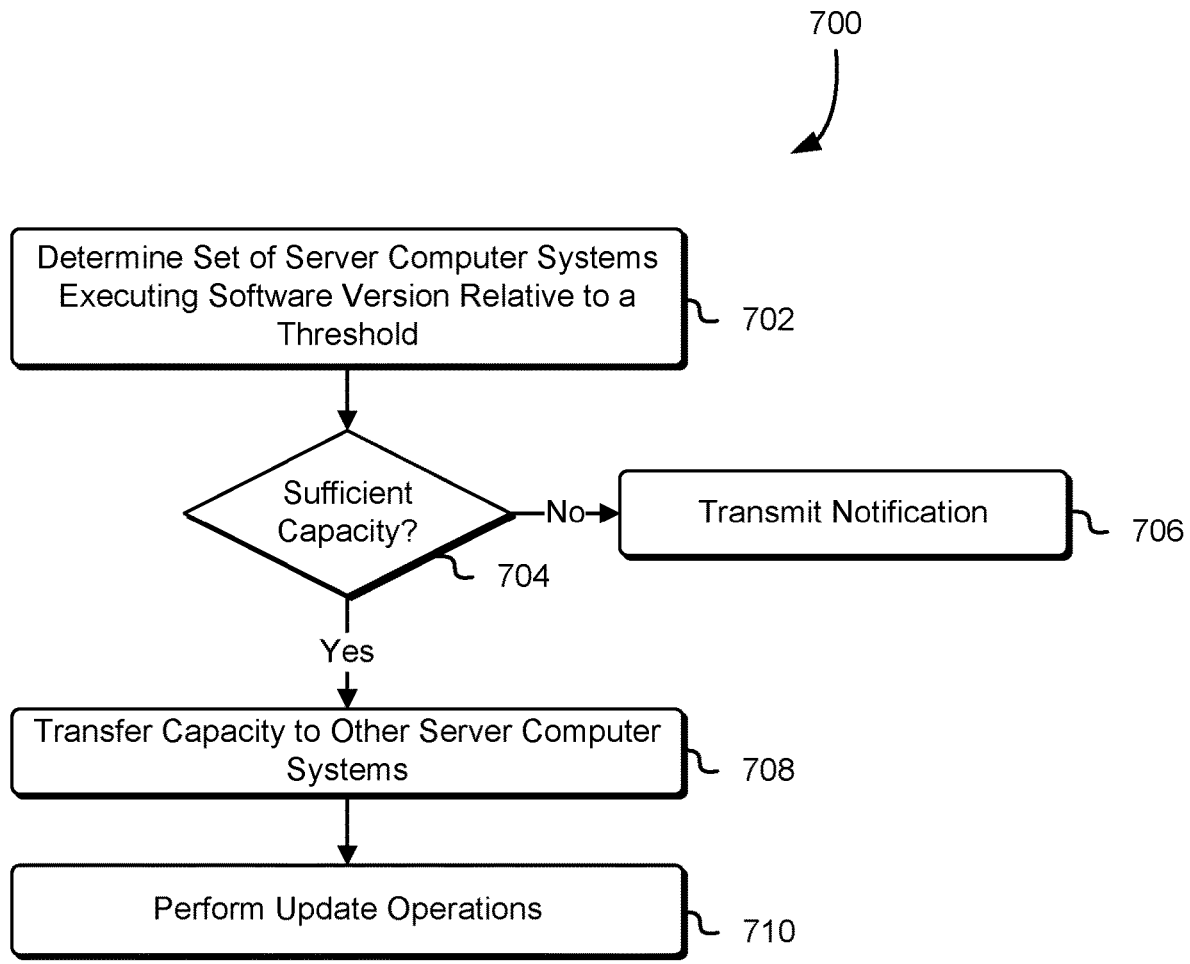
FIG. 7 shows an illustrative process which may be used to decommission a set of server computer systems that are executing out-of-date software and update the software of the set of server computer systems in accordance with an embodiment.

FIG. 7 is a block diagram illustrating an example of a process 700 for decommissioning and updating a set of server computer systems in accordance with at least one embodiment. Some or all of the process 700 (or any other processes described, or variations and/or combinations of those processes) may be performed under the control of one or more computer systems, including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 700 may be performed by any suitable system, such as a server in a data center, by various components of the environment 100 described in conjunction with FIG. 1, such as the deployment subsystem, by multiple computing devices in a distributed system of a computing resource service provider or by a service provided by a computing resource service provider. The process 700 includes a set of operations that causes a set of server computer systems to transfer capacity to other server computer systems so that the server computer systems may be updated. For example, the process 700 includes determining a set of server computer systems executing a software version that exceeds a value relative to a threshold 702. In one illustrative example, if the version of the software executed by the server computer systems is greater than or equal to three versions older than the current version of the application and/or software. In another example, the server computer systems determines a number of days since the software executed by the server computer systems has been updated.

In step 704, the deployment system determines if other server computer systems (e.g., server computer systems in a fleet executing a current version of the software) contain sufficient capacity to support the capacity of the set of server computer systems. In various embodiments, the deployment system determines if transferring the capacity to one or more other server computer systems does not violate one or more constraints to ensure that performance of the server computer systems is not overly impacted by the additional capacity. For example, the server computer systems may have constraints and/or rules one an amount of capacity the server computer systems can support. In step 706, if the deployment subsystem determines there is insufficient capacity, the deployment subsystem transmits a notification 706. For example, the deployment subsystem may transmit a notification of insufficient capacity to a management subsystem as described above. The notification, in various embodiments, indicates that addition computing capacity is required to be added to the fleet to complete the updated to the remaining server computer systems. This information may be provided to an engineer or system administrator who may determine appropriate action. In step 708, if there is sufficient capacity, the deployment system causes the capacity of the set of servers to be transferred to the other sever computer systems. In one example, the logical storage volumes maintained by the set of server computer systems is transferred to the other server computer systems. In various embodiments, the management subsystem receives an API call to transfer a logical storage volume from a first server computer system to a second server computer system and causes the execution of a workflow that, when executed by various components of a data storage service as described above, causes the first server computer system to transfer over a network data of the logical storage volume to the second server computer system for storage to one or more hard disk drives of the second server computer system.

In step 710, the deployment subsystem causes the set of server computer systems to perform update operations. The update operation may include execution of an update script as described above. Note that one or more of the operations performed in 702-710 may be performed in various orders and combinations, including in parallel. In numerous variations to the process 700, one or more of the operations 702-710 may be omitted or performed by other systems of services.

Figure 8:
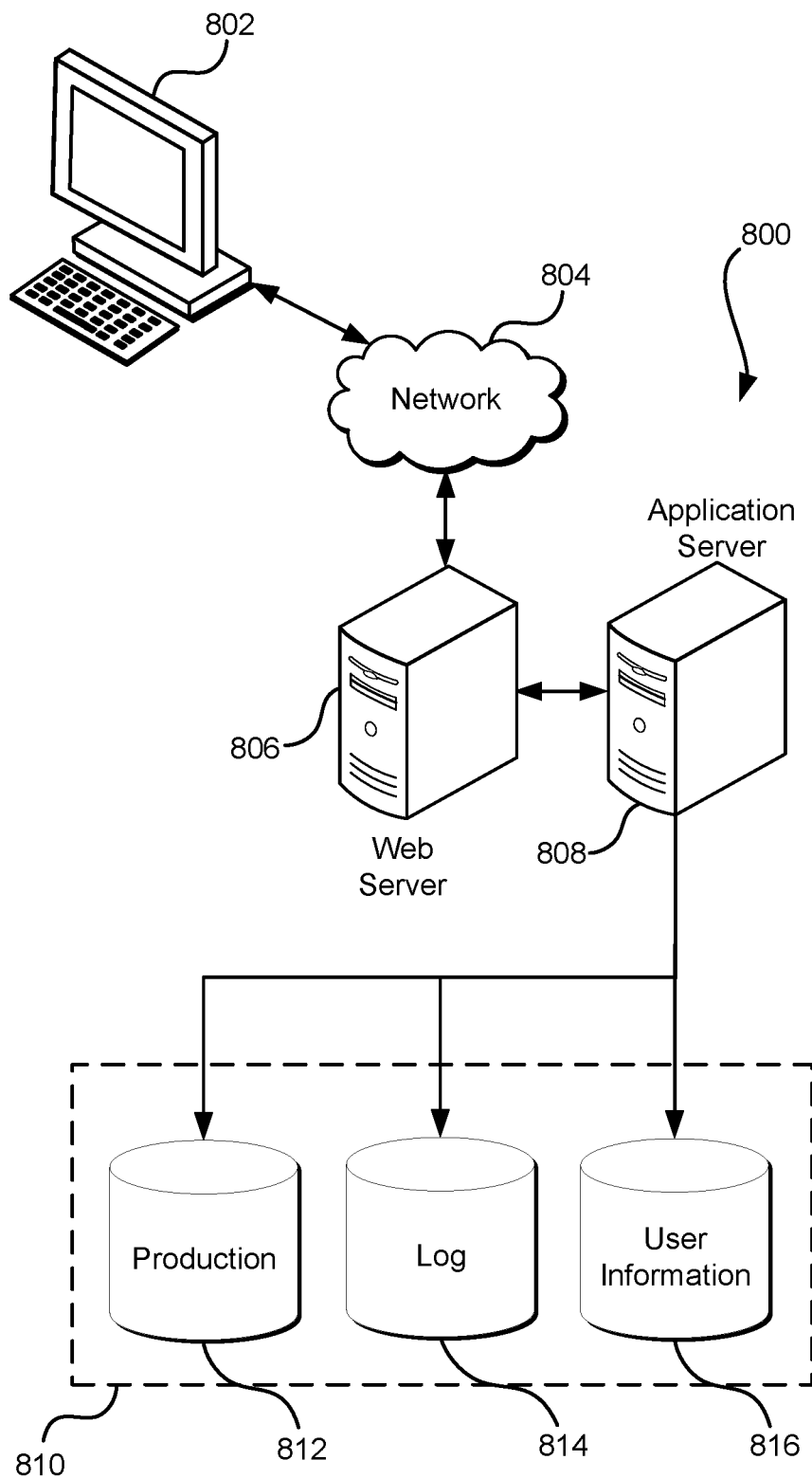
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network, and/or combination thereof. Components used for such a system can depend at least in part upon the type of network and/or environment selected. Many protocols and components for communicating via such a network are well known and will not be discussed herein in detail. Communication over the network can be enabled by wired or wireless connections and, combinations thereof. In this example, the network includes the Internet and/or other publicly addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A non-transitory computer-readable storage medium storing executable instructions that, as a result of being executed by one or more processors of a computer system, cause the computer system to at least:

obtain an update to an application executed by a server computer system operated by a computing resource service provider;

generate an update script based at least in part on the update, the update script including a plurality of conditions and a plurality of operations, at least one condition of the plurality of conditions indicating that a volume served by the server computer system is to be available on another server computer system prior to updating the application;

provide the update script to the server computer system;

cause the server computer system to execute the update script, the update script causing the server computer system to:

generate a set of determinations, members of the set of determinations indicate whether a condition of the plurality of conditions is satisfied; and as a result of the at least one condition not being satisfied based at least in part on a determination of the set of determinations, perform at least one operation to satisfy the at least one condition and returning an exception;

as a result of obtaining the exception, update a wait list to indicate that the server computer system will rerun the script at a later time; and as a result of determining that the plurality of conditions is satisfied based at least in part on the set of determinations, cause the server computer system to update the application.

2. The non-transitory computer-readable storage medium of claim 1, wherein the instructions further include instructions that cause the computer system to determine a set of server computer systems to provide the update script based at least in part on version information associated with at least a portion of the set of server computer systems, the version information indicating that the portion of the set of server computer systems is executing an older version of the application than at least one other server computer system of the set of server computer systems.

3. The non-transitory computer-readable storage medium of claim 2, wherein the instructions that cause the computer system to determine the set of server computer systems to provide the update script to further include instructions that cause the computer system to determine the set of server computer systems based at least in part on a number of server computer systems operated by the computing resource service provider.

4. The non-transitory computer-readable storage medium of claim 2, wherein the instructions that cause the computer system to determine the set of server computer systems to provide the update script to further include instructions that cause the computer system to determine the set of server computer systems based at least in part on a maximum number of server computer systems to be updated during an interval of time.

5. The non-transitory computer-readable storage medium of claim 1, wherein the instructions further comprise instructions that, as a result of being executed by the one or more processors, cause the computer system to:

determine a set of server computer systems that failed to execute the update script;

cause the set of server computer systems to transfer capacity to at least one other server computer system; and cause the set of server computer systems to execute the update script.

6. The non-transitory computer-readable storage medium of claim 1, wherein the instructions further comprise instructions that, as a result of being executed by the one or more processors, cause the computer system to update metadata associated with a logical storage volume based at least in part on a second determination that a first partition of the logical storage volume of the server computer system contains more data written to a disk of the server computer system associated with the logical storage volume than a second partition of the logical storage volume maintained by a second server computer system.

7. The non-transitory computer-readable storage medium of claim 1, wherein the server computer system further comprises a data storage server implementing a block-level data storage server provided to customers of the computing resource service provider.

8. The non-transitory computer-readable storage medium of claim 1, wherein the instructions that cause the server computer system to execute the update script further include instructions that cause the server computer system to perform the at least one operation of the plurality of operations to satisfy the at least one condition by at least:

causing a first logical storage volume to be copied to another server computer system as a result of transmitting a first exception indicating that a copy of the first logical storage volume is not maintained on at least one other server computer system;

causing a second logical storage volume to be moved as a result of transmitting a second exception indicating that the second logical storage volume is associated with a snapshot operation; and causing at least one logical storage volume to be deleted as a result of transmitting a third exception indicating that the server computer system contains at least one unused logical storage volume.

9. The non-transitory computer-readable storage medium of claim 8, wherein the instructions further comprise instructions that, as a result of being executed by the one or more processors, cause the computer system to:

obtain at least one exception of the first exception, the second exception, or the third exception;

determine, as a result of obtaining the at least one exception, the server computer system failed to satisfy the at least one condition of the plurality of conditions; and cause information associated with the server computer system to be updated in the wait list indicating that the server computer system is awaiting execution of the update once the plurality of conditions is satisfied.

10. A computer-implemented method, comprising:

obtaining, at a deployment subsystem, an update script to update software executed by a server computer system, the update script indicating a plurality of operations that, as a result of being executed successfully, causes the server computer system to update the software, the update script further indicating a plurality of conditions, at least one condition indicating that a volume served by the server computer system is to be available on another server computer system prior to updating the software;

determining, by the deployment subsystem, a set of server computer systems to provide the update script;

providing the update script to the set of server computer systems;

the update script causing the server computer system, where the server computer system is a member of the set of server computer systems, to:

generate a plurality of checks for the plurality of conditions, where at least one check of the plurality of checks indicates that the at least one condition is not satisfied; and as a result of the at least one check indicating that the at least one condition is not satisfied, cause the server computer system to transmit an exception and perform an operation of the plurality of operations to satisfy the at least one condition;

in response to the exception, storing information associated with the server computer system in a wait list indicating that the server computer system has failed at least one operation and that the server computer system will rerun the update script; and determining the server computer system has updated the software based at least in part on the server computer system re-executing the update script and the plurality of checks indicating that the plurality of conditions is satisfied.

11. The computer-implemented method of claim 10, wherein the computer-implemented method further comprises:

receiving a second exception as a result of an operation of the server computer system; and updating the information associated with the server computer system in the wait list to indicate that the server computer system has failed to update the software and the update script will not be rerun.

12. The computer-implemented method of claim 11, wherein the computer-implemented method further comprises:

selecting the server computer system from the wait list; and causing the server computer system to rerun the update script.

13. The computer-implemented method of claim 10, wherein performing the at least one operation of the plurality of operations further comprises:

transmitting a first exception to the deployment subsystem indicating that a redundant copy of a first logical storage volume is not maintained by another server computer system;

performing, as a result of transmitting the first exception, a remirroring operation on the first logical storage volume maintained by the server computer system, such that a copy of the first logical storage volume is maintained by at least one other server computer system of the set of server computer systems;

transmitting a second exception to the deployment subsystem indicating that a second logical storage volume was included in a snapshot operation;

performing, as a result of transmitting the second exception, an operation that causes the second logical storage volume to be moved to the at least one other server computer system as a result of the second logical storage volume being included in the snapshot operation;

transmitting a third exception to the deployment subsystem indicating that at least one logical storage volume is unused;

causing, as a result of transmitting the third exception, the at least one logical storage volume to be deleted;

generating a determination that no exceptions to an execution of the update script are detected; and causing, as a result of generating the determination, the server computer system to execute the update script to update software executed by the server computer system.

14. A system, comprising:

one or more processors; and memory that stores computer-executable instructions that, as a result of being executed by the one or more processors, cause the system to:

determine a server computer system of a set of server computer systems to provide an update, the update specifying a set of operations that causes the server computer system to update software associated with the server computer system and a plurality of conditions, at least one condition of the plurality of conditions indicating that a volume served by the server computer system is to be available on at least one other server computer system prior to executing the update;

provide the update to the server computer system operated by a computing resource service provider, the update causing the server computer system to:

perform a plurality of checks of the plurality of conditions to determine whether conditions of the plurality of conditions are satisfied, at least one check of the plurality of checks indicating that the at least one condition is not satisfied; and as a result of the at least one check indicating that the at least one condition is not satisfied, return an exception and perform at least one operation of the set of operations to satisfy the at least one condition;

in response to the exception, cause information associated with the server computer system to be stored in a wait list indicating that the server computer system is awaiting execution of the update once the at least one condition is satisfied; and in response to the at least one condition being satisfied, cause the server computer system to execute the update.

15. The system of claim 14, wherein the computer-executable instructions that cause the system to provide the update to the server computer system further include computer-executable instructions that, as a result of being executed by the one or more processors, cause the system to determine the server computer system based at least in part on a minimum value of a percentage of a number of server computer systems operated by a computing resource server provider.

16. The system of claim 14, wherein the update further causes the server computer system to:

as a result of determining that a copy of a first logical storage volume is not maintained by another computer system based at least in part on a first check of the plurality of checks, transmitting a second exception and causing the copy of the first logical storage volume to be maintained by the other computer system;

as a result of determining that a second logical storage volume is associated with a snapshot operation based at least in part on a second check of the plurality of checks, transmitting a third exception and causing the second logical storage volume to be moved to the other computer system;

as a result of determining that a third logical storage volume is unused based at least in part on a third check of the plurality of checks, transmitting a fourth exception and causing the third logical storage volume to be deleted; and as a result of determining that a condition of the plurality of conditions related to maintaining information by the server computer system is satisfied, causing the server computer system to update software executed by the server computer system.

17. The system of claim 14, wherein the computer-executable instructions that cause the system to provide the update to the server computer system further include computer-executable instructions that, as a result of being executed by the one or more processors, cause the system to determine, based at least in part on version information associated with the software executed by the server computer system, the server computer system.

18. The system of claim 14, wherein the computer-executable instructions that cause the system to provide the update to the server computer system further include computer-executable instructions that, as a result of being executed by the one or more processors, cause the system to determine, based at least in part on a hardware component included in the server computer system, the server computer system.

19. The system of claim 14, wherein the computer-executable instructions further include computer-executable instructions that, as a result of being executed by the one or more processors, cause the system to:

determine the server computer system failed to satisfy the condition; and cause information associated with the server computer system to be stored updated in the wait list indicating that the server computer system is awaiting execution of the update once the condition is satisfied.

20. The system of claim 14, wherein the computer-executable instructions further include computer-executable instructions that, as a result of being executed by the one or more processors, cause the system to:

determine the server computer system failed during execution of the update; and cause information associated with the server computer system to be stored in a failed list indicating that the server computer system was unable to execute the update.

* * * * *

UNITED STATES PATENT AND TRADEMARK OFFICE
CERTIFICATE OF CORRECTION

PATENT NO. : 10,649,759 B1
APPLICATION NO. : 15/801068
DATED : May 12, 2020
INVENTOR(S) : Julien Delange et al.

It is certified that error appears in the above-identified patent and that said Letters Patent is hereby corrected as shown below:

In the Specification

Column 5, Line 3: "server information 106 to the deployment subsystem 104."
Should read as: -- server information to the deployment subsystem 104. --

Column 5, Line 6: "1 for simplicity), which enable communication between"
Should read as: -- 1 for simplicity), which enables communication between --

Column 5, Line 39: "in an embodiment, the logical storage volumes includes a"
Should read as: -- in an embodiment, the logical storage volumes include a --

Column 5, Line 42: "such embodiments, sever computer systems, during"
Should read as: -- such embodiments, server computer systems, during --

Column 6, Line 30: "server computer systems restarts and successfully installs"
Should read as: -- server computer systems restart and successfully install --

Column 9, Line 21: "the server computer systems is not maintaining unused data"
Should read as: -- the server computer systems are not maintaining unused data --

Column 9, Line 25: "example, the server computer systems contains a storage"
Should read as: -- example, the server computer systems contain a storage --

Column 9, Lines 27-29: "storage partition and, as a result, transmits an exception to the deployment subsystems 304 and causes the storage partition to be remirrored or otherwise causes a copy of the"
Should read as: -- "storage partition and, as a result, transmit an exception to the deployment subsystems 304 and cause the storage partition to be remirrored or otherwise cause a copy of the --

Column 12, Line 63: "need to be performed before the update scrip can be"

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*

Should read as: -- need to be performed before the update script can be --

Column 13, Line 2: "to repair the server computer system and places the sever"
Should read as: -- to repair the server computer system and place the server --

Column 13, Line 21: "If the server computer systems returns an indication of"
Should read as: -- If the server computer systems return an indication of --

Column 13, Line 36: "updates to be execute for an interval of time (e.g., 2 days)"
Should read as: -- updates to be executed for an interval of time (e.g., 2 days) --

Column 13, Line 44: "have been updated, the during of the update interval"
Should read as: -- have been updated, the duration of the update interval --

Column 14, Line 29: "server computer systems maintains one or more storage"
Should read as: -- server computer systems maintain one or more storage --

Column 14, Line 62: "or may query other server computer systems to detect a sever"
Should read as: -- or may query other server computer systems to detect a server --

Column 15, Line 24: "computer systems has completed a restart after updating the"
Should read as: -- computer systems have completed a restart after updating the --

Column 15, Line 27: "volumes (e.g., master partition and slave partition) contains"
Should read as: -- volumes (e.g., master partition and slave partition) contain --

Column 15, Line 35: "when the server computer systems is restarting, the customer"
Should read as: -- when the server computer systems are restarting, the customer --

Column 16, Line 16: "example, the server computer systems determines a number"
Should read as: -- example, the server computer systems determine a number --

Column 16, Line 29: "have constraints and/or rules one an amount of capacity the"
Should read as: -- have constraints and/or rules on an amount of capacity the --

Column 16, Lines 36-37: "embodiments, indicates that addition computing capacity is required to be added to the fleet to complete the updated to"
Should read as: -- embodiments, indicates that additional computing capacity is required to be added to the fleet to complete the update to --

Column 16, Line 42: "of the set of servers to be transferred to the other sever"
Should read as: -- of the set of servers to be transferred to the other server --